FIG. 11 PARTIAL POWER

FIG. 10 IDLE

FIG. 9 WARM STARTING

FIG. 8 COLD STARTING

FIG. 8a

United States Patent Office 3,667,739
Patented June 6, 1972

3,667,739
PROCESS AND APPARATUS REGULATING THE FUEL-AIR MIXTURE IN INTERNAL COMBUSTION ENGINES OPERATING WITH CARBURETORS
Franz Menke, Neckargemund, Germany, assignor to Eltro GmbH & Co., Heidelberg, Germany
Filed Dec. 9, 1969, Ser. No. 883,433
Int. Cl. F02m 1/10, 7/04
U.S. Cl. 261—1    15 Claims

ABSTRACT OF THE DISCLOSURE

A process and apparatus for regulating a fuel-air mixture for internal combustion engines comprises a plurality of telescoped tubes defining Venturi passages for discharging air at constant velocity in the region of a variable fuel inlet. The inlet and air passages are conjointly regulated to be correspondingly varied in size to change engine operation. The size of the fuel inlet is additionally and independently regulated, in superposition with the above regulation, in response to temperature and pressure changes during variation of engine operating conditions.

BRIEF SUMMARY OF THE INVENTION

The invention relates to a process and an apparatus for the regulation or grading of fuel-air mixtures in internal combustion engines operating with carburetors.

Whether such an internal combustion engine can operate economically in all ranges of speed and load depends primarily on the process employed in the grading of the mixture of fuel and air, as well as on the construction and method of operation of the carburetor. In the present state of the art, the manner in which a fuel-air mixture with liquid fuels should be composed in order to obtain perfect combustion in the cylinders of an internal combustion engine is fairly precisely known. However, no process is yet known which is suitable for supplying the most propitious mixture of air and fuel for every possible range of operation, nor is any apparatus known which makes it possible to regulate the fuel-air mixture in such a way as to obtain complete combustion in the working cylinders in all working ranges.

In the known types of carburetor, the fuel-air mixture regulation is not effective for all ranges of speed and load of the engine with a simple mixing system in which the formation and supply of the mixture is regulated. On the contrary, it is a matter of compromise solutions, in which several systems combine in various ways for starting, idling, acceleration, partial load, full load and braking (zero delivery).

When carburetion is not correctly formulated to the exact working conditions, the mixture is incompletely burned in the engine cylinders and noxious waste gases are introduced into the exhaust. This is attributable to the fact that the flame front spreading in the combustion chamber after ignition requires a certain time for complete combustion of the fuel and air mixture, the length of which depends on a number of factors such as pressure, temperature, mixture ratio and degree of turbulence. The ratios become more critical the higher the speed of the internal combustion engine. At high speeds, it may occur that the fuel-air mixture is not yet completely consumed up to the beginning of the exhaust stroke.

Good carburetion can be obtained with a carburetor construction in which the fuel feed is regulated as a function of the suction pipe vacuum. This type was consummated with English partial vacuum carburetor. The suction pipe partial vacuum actuates a piston with a jet needle, whose fine-tapered point in the form of an elongated cone extends into a circular jet orifice.

Recently motorcycle carburetors working on the above principle have been announced from Japan (Technical Journal: Das Motorrad, No. 18, pp. 516–517, Aug. 27, 1966). A similar version for automobiles appears in Auto, Motor und Sport, No. 21, pp. 22–23, Oct. 15, 1966, as Stromberg's CD-carburetor.

These carburetors have chokes and throttle valves or slide valves for priming and operating the engines. However, complete fuel-air mixture combustion without residues is still unattained by these carburetors.

This holds true especially for transitions from one working condition of the engine to another, e.g. during acceleration, as is increasingly necessary in urban automobile traffic. In such driving conditions, fuel consumption increases considerably.

An object of the invention is to regulate the fuel-air mixture gradation of a motor vehicle engine such that a substantally complete combustion of fuel is attained under all expected running conditions.

According to the invention, a process for graduating the fuel-air mixture for internal combustion engines is so designated that (a) an approximately constant gas or air velocity is maintained throughout the whole range of capacity;
(b) a change in the sectional area of the aperture for air or gas admission involves a corresponding change of sectional area of the fuel jets;
(c) a timing arrangement is superposed on the alteration of the aperture cross-section of the fuel jets, such timing arrangement being dependent on fluctuations of pressure in the suction pipe, changes in temperatures, and changes of atmospheric pressure.

BRIEF DESCRIPTION OF THE DRAWING

FIG. 6a is an elevation of a regulator needle,
FIG. 6b is a sectional view taken along line b—b in FIG. 6a,
FIG. 6c is a side view of another embodiment of a regulator needle,
FIG. 6d is a front view of the needle in FIG. 6c,
FIG. 6e is a sectional view taken along line e—e in FIG. 6d,
FIG. 6f is an elevation view showing the needle of FIG. 6a in a modified fuel supply arrangement,
FIG. 8a is a sectional view taken along line a—a in FIG. 8,
FIGS. 9–14 show the device in different operating conditions of the engine.

DETAILED DESCRIPTION

Figure 1:
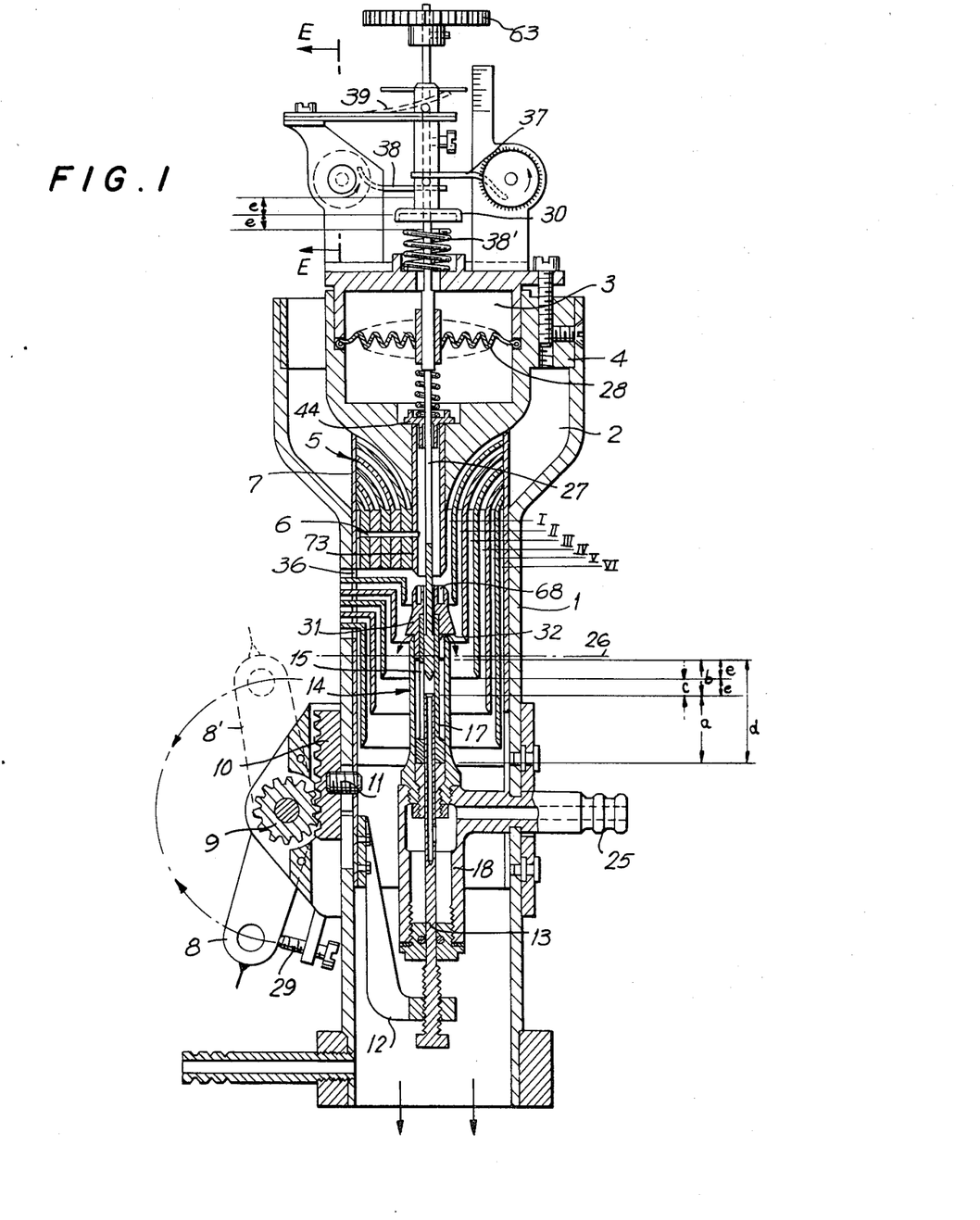
FIG. 1 is a longitudinal sectional view through one embodiment according to the invention.
Figure 2:
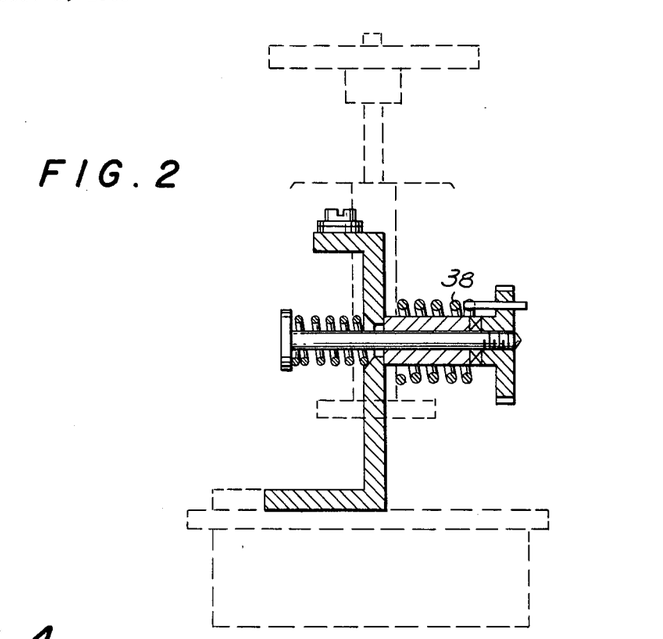
FIG. 2 is a sectional view of a detail of FIG. 1.

FIGS. 1 and 2 are provided to show how the process operates. Referring to FIG. 1, the fuel-air mixture gradation takes place in a cylindrical tubular body 1 which is enlarged at 2 at the air intake end for accommodation of a fuel flow regulator 3. Regulator 3 is fastened to the air inlet 2 at three points, of which one fixing point 4 is shown.

A Venturi tube 5 divided into six cylindrical channels I, II, III, IV, V, VI of different lengths is firmly attached to the regulator 3. The portions of tube 5 forming the channels are fixed by three screws at the same height, one of which screws is shown at 6.

The inside boundary of channel I is formed by the external wall of the flow regulator 3, which tapers onto a tube 73 at its lower extremity.

Venturi tube 5 is surrounded by a sleeve valve 7 which is slidably arranged inside the tubular body 1 and can be shifted by means of a control lever 8 through a pinion 9, a ratchet 10 and a follower pin 11 engaging said ratchet and fastened to sleeve valve 7. As can be seen from FIG. 1, at one position of the control lever, the passage to the air channels I to VI is completely closed at zero degrees. In this position, lever 8 rests against a set screw 29. When lever 8 is swung upward to position 8', the air passage to all of the channels I to VI is open.

The significance of Venturi tube 5 is that each of the circular channels I to VI acts as an independent Venturi tube. This is attained in the following manner:

Channels I to VI are made from tubes telescoped into one another. At the outer periphery of these tubes, recesses 19, 20 and 21 are cut out (FIG. 7), their shape being in each case equivalent to the longitudinal section of one Venturi tube. The cut-outs can be rectilinear or spiral. Between the individual recesses are upright fillets 22, 23 and 24, which form the lateral boundary of the channels. Successive tubes have smooth outer surfaces bearing against the fillets of the next outer tube to subdivide the circular channels into several fractional channels, each of which is equivalent to a Venturi channel.

On the far side of the air nozzle, a nozzle holder 18, through which fuel flows in, projects into the suction pipe portion. A tubular nozzle assembly 14 is screwed onto the nozzle holder; the assembly incorporates in its interior a nozzle tube 17 provided with a slot 15. The nozzle assembly is closed at its top by a cap 31 which holds the top of nozzle tube 17 in place.

The adjustability of sleeve valve 7 effects two control functions:

(1) it varies the effective sectional area of admission in Venturi tube 5, and (2) it causes corresponding sliding movement of a hollow nozzle needle 13 in tube 17, the needle 13 being firmly connected with sleeve valve 7 through a clip 12. In this way an entirely definite sectional area of fuel admission of the nozzle slot 15 is assigned to each sectional area of air admission of Venturi tube 5.

In the embodiment depicted in FIG. 1, the length of the nozzle slot 15 is equivalent to the distance $d$. This distance $d$ can be, for example, 15 to 20 mm. Assuming $d=20$ mm., when sleeve valve 7 moves through the distance $a$, the hollow needle 13 closes the nozzle slot to a length of 14 mm. or opens it by the same length according to the direction of motion.

A solid regulator needle 27 extends upward from tube 17, and at a state of rest closes a distance $e$ of 3 mm. of the still available length $b$ of 6 mm. The then remaining available length, also about 3 mm., remains open.

If this embodiment of the carburetor is connected to an engine and if fuel is supplied through tube 25 up to chain-dotted line 26, and the engine is turned over for starting, the partial vacuum arising in the carburetor body 1 will suck regulator needle 27, which is fastened to a spring member 28, downward by the distance $c$ until it pushes against nozzle needle 13. Thereupon, the nozzle slot 15 and sleeve valve 7 are completely shut.

For idling, the set screw 29 is screwed in a little further. In this case, control lever 8 is thus impeded from reaching the 0° (zero) line, and channel I of the Venturi tube is open to a slight degree.

Now, when the engine is started, the regulator needle 27 is again immediately sucked downward and an attached plate 30 thereon comes to a rest (after covering the distance $c$) against a fairly strong helical spring 38'. The resistance of this spring 38' is overcome only upon operation of the brakes of the vehicle.

At low speed, however, e.g. idling, a length of the fuel nozzle slot 15 remains open, equivalent to the length the sleeve valve 7 opens channel I of the Venturi tube 5, because jet needle 13 is mechanically connected with the sleeve valve.

Figure 3:
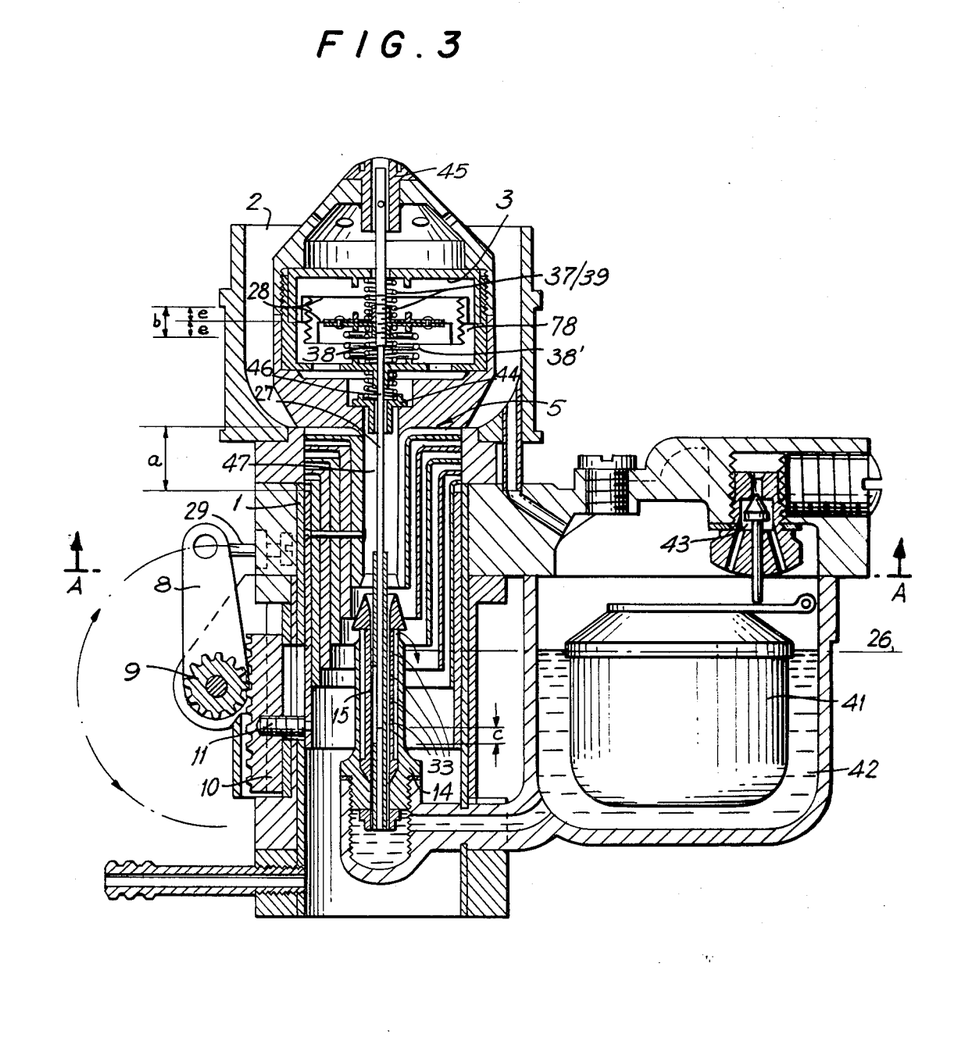
FIG. 3 is a longitudinal sectional view of another embodiment according to the invention.
Figure 7:
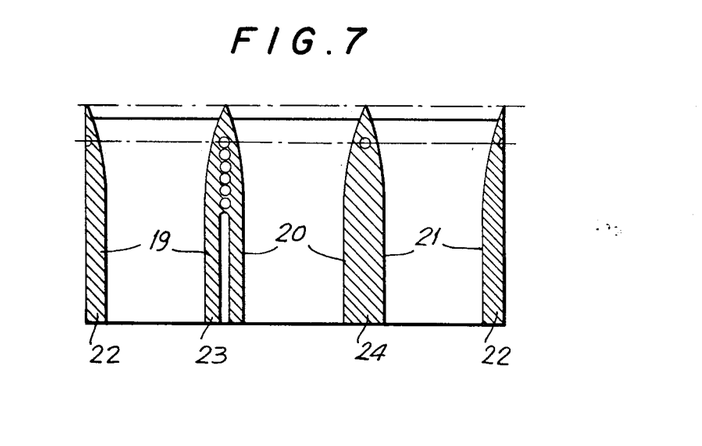
FIG. 7 shows a part of the developed projection of channel VI of the air supply tube,
FIG. 8 diagrammatically shows the working position of the device according to the invention during cold starting of the engine.

As the air can only stream in through the narrow channel I, and as this acts as a Venturi tube, a comparatively small amount of air per unit of time flows across cap 31 of the nozzle assembly 14 at high velocity. This generates so high a partial vacuum at the bottom edge 32 of the cap that the atmospheric pressure acting on the fuel surface 26 in the float chamber forces the fuel out of nozzle tube 17 through orifices 33 (FIG. 3). These orifices are centered one-by-one beneath the Venturi canals 19, 20, 21 of Venturi tube 5 (FIG. 7). The fuel-enriched air flowing past the canals reaches the engine cylinders and when ignition contact is made, the engine starts and continues to run at idle.

When grading the fuel-air mixture, several elements interact in the carburetor, without the need for separate flow routes for that purpose.

The superposition of these components sets the exhaust aperture of fuel nozzle slot 15 to its effective length $c$. The superposition is obtained primarily through regulation of the aperture of Venturi tube 5 by the control lever 8 and the control integrally linked thereto of the aperture of nozzle slot 15 by hollow needle 13 in the region of interval $a$. To this, the movement of governor needle 27, automatically controlled by the counter-pressure and/or bimetal spring 39, is added or subtracted in the region of interval $b$, producing the effective length $c$ of nozzle slot 15. This keeps the fuel-air mixture in a constant mixture ratio of, for example, 15:1 for each rate of air flow.

The new process for fuel-air mixture regulation creates extremely favorable conditions for flow and partial vacuum. The main ground for that is to be sought in the fact that any asymmetry in the air column flow is avoided and therefore no turbulence phenomena unfavorable to carburetion can ensue.

A considerable increase in efficiency can be immediately obtained by use of the specified process.

As can be seen from FIG. 1 the sleeve valve 7 contains one orifice 36. The walls of the tubular body 1 in front of the sleeve valve are provided with successively smaller number of orifices arranged one under another. In the position of the sleeve valve as shown in FIG. 1, the uppermost orifices of all cylinders communicate with the orifice 36 of the sleeve valve and with the end of the annular channel I so that suction pressure existing at the end of the air throttle valve 1 can be transmitted via this arrangement to a measuring apparatus. The suction pressure for various positions of the sleeve valve can also be read.

A further improvement in the formation of the mixture, and indeed right up to the carburetion of the fuel, is obtainable by use of ultrasonic vibrations.

Figure 5:
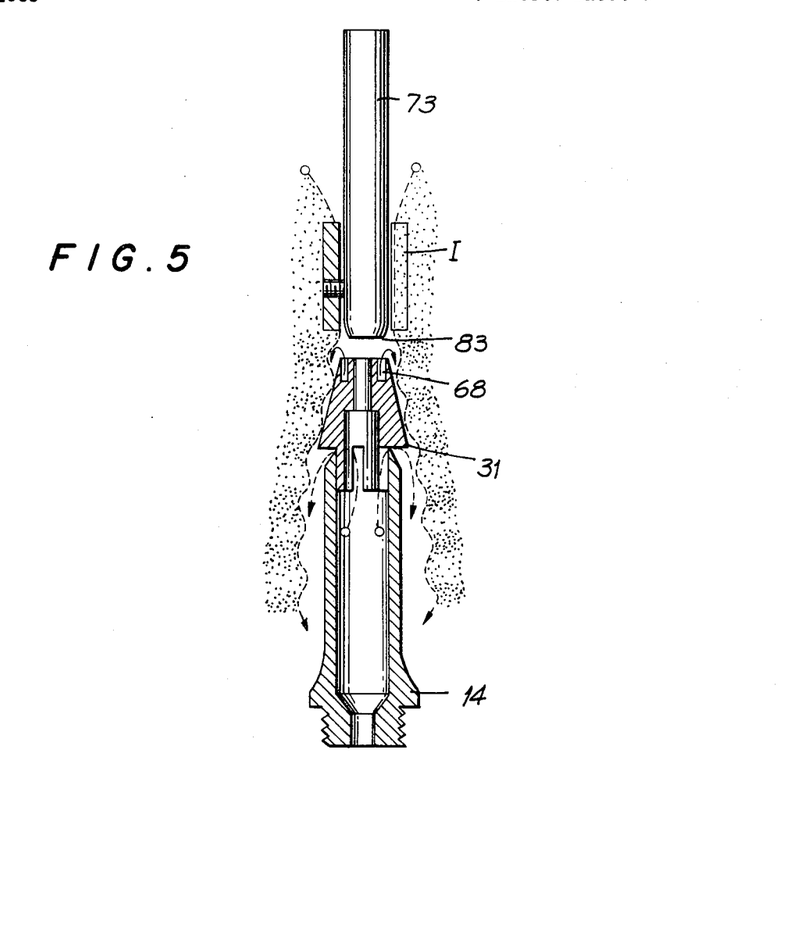
FIG. 5 is a sectional view of an ultrasonic vibrator device.

For this purpose, cap 31 of nozzle assembly 14 (FIG. 1) is operative in combination with nozzle channel I to form an ultrasonic ejection, as shown in detail in FIG. 5. The only additional requirement is that the end of tube 73, opposite the cap 31 of nozzle assembly 14, which makes up the inside wall of Venturi tube channel I, have a chamfered edge inclined sharply towards the middle of the carburetor. At the same time, nozzle cap 31 has an annular recess 68 therein, whose outer bounding edge is also sharply chamfered back to the center.

The diameter of the sharp edge at the end of tube 73 is a few tenths of a millimeter smaller (non-critical) than that of the recess in nozzle cap 31, which acts as an oscillator. Sonic vibrations of 20 to 60 kc./s. corresponding to wavelength of 15 to 5 mm. respectively are produced dependent on the velocity of the passing current of air or air volume of the annular clearance. The fuel issuing from the nozzle assembly enters these air vibrations and becomes atomized by adsorption of the sonic energy. This produces a fuel-air mixture.

It goes without saying that the ultrasonic energy can also be produced by means of electrodynamic, magnetostrictive or piezoelectric ultrasonic transmitters.

Figure 4:
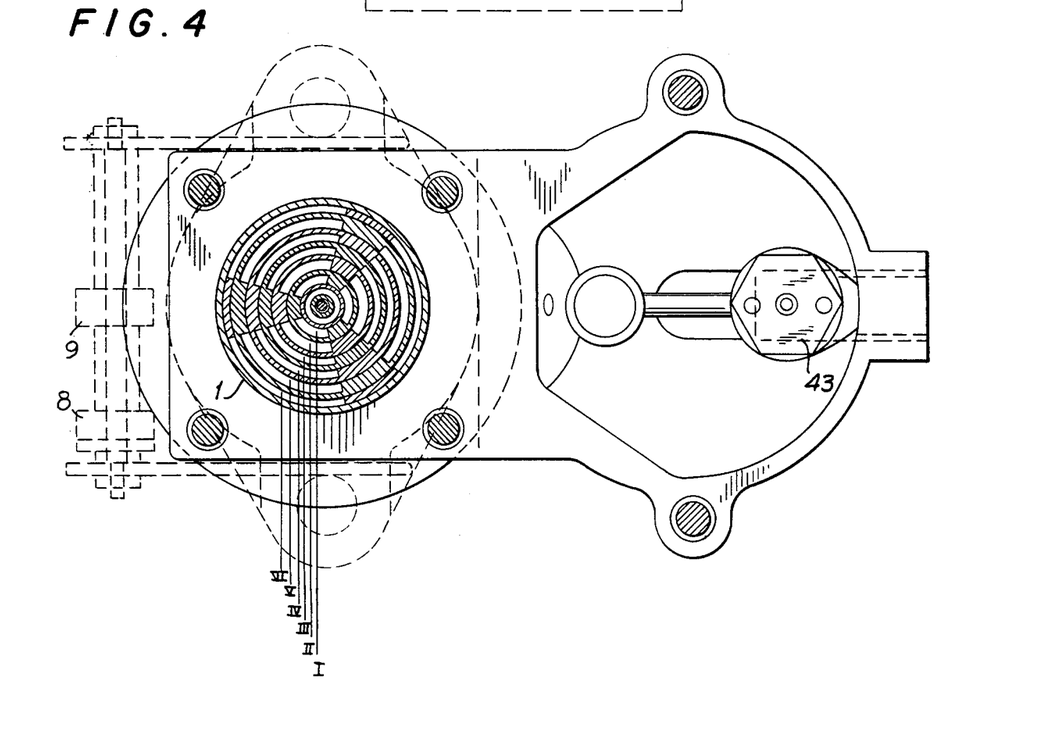
FIG. 4 is a sectional view taken along line A—A in FIG. 3.

FIGS. 3 and 4 depict an operative embodiment of the carburetor.

FIGS. 8–14 explain the individual positions of the automatically controlled regulator system for transitions during operation.

In contrast to the embodiment according to FIG. 1, the one in FIG. 3 does not contain any sleeve member 7. Instead, the Venturi tube 5 is movable up and down in the cylindrical casing 1. Conjointly, the regulator system 3 and the fuel jet needle 27 continuous therewith, are also moved upward and downward. The inlet cross-section of air in tube 5 then varies because the tube 5 adjustably protrudes from body 1 into the expanded chamber 2 and because the ring inlets I'–VI' (FIG. 12) on the upper periphery of tube 5 pertaining to the individual cylinder channel I–VI are released one after the other at any particular time.

FIG. 3 shows tube 5 in casing 1 with channels I–VI closed.

Figure 11:
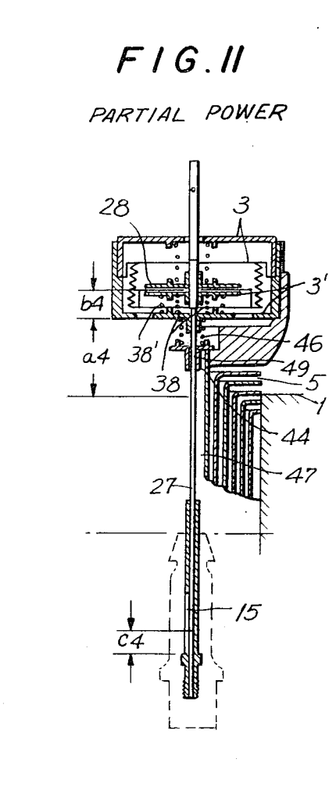

In FIG. 11, tube 5 is halfway out (partial load). The regulation of the effective length of the clearance $c$ of the fuel slot 15 is obtained from the movement of jet needle 27 over distance $a$, conditioned by the sliding of tube 5 and the movement over distance $b$ caused by regulator system 3, which movements are superimposed on one another (see FIG. 11).

Float 41 in float chamber 42 determines the condition of the fuel level and accordingly its level in the nozzle assembly 14 by opening and closing of valve 43 in known manner.

The position of spring unit 28 and correspondingly the position of fuel needle 27 depends on the air pressure, available at any moment during the running of the engine, on the far side of the air tube 5 in the region of cap 31 of nozzle assembly 14. Furthermore, the coordination of springs 37, 39, 38 and 38' (FIG. 3) affect the location of the fuel needle 27. In this arrangement valve poppet assembly 44 acts as a dashpot.

If the engine is running on partial load, this will be equivalent to the carburetor setting shown in FIG. 11. Here the spring unit 28 is pulled down by partial vacuum in the suction pipe in bore 47, as far as spring 38'. When the spring unit 28 is drawn down, the needle 27 also travels the same path. The partial vacuum enters through the narrow slit 49 between the bore in valve 44 and the stem of the needle 27 in the spring unit. The motion of the spring unit is slowed down by the narrow slit.

Figures 12, 13:
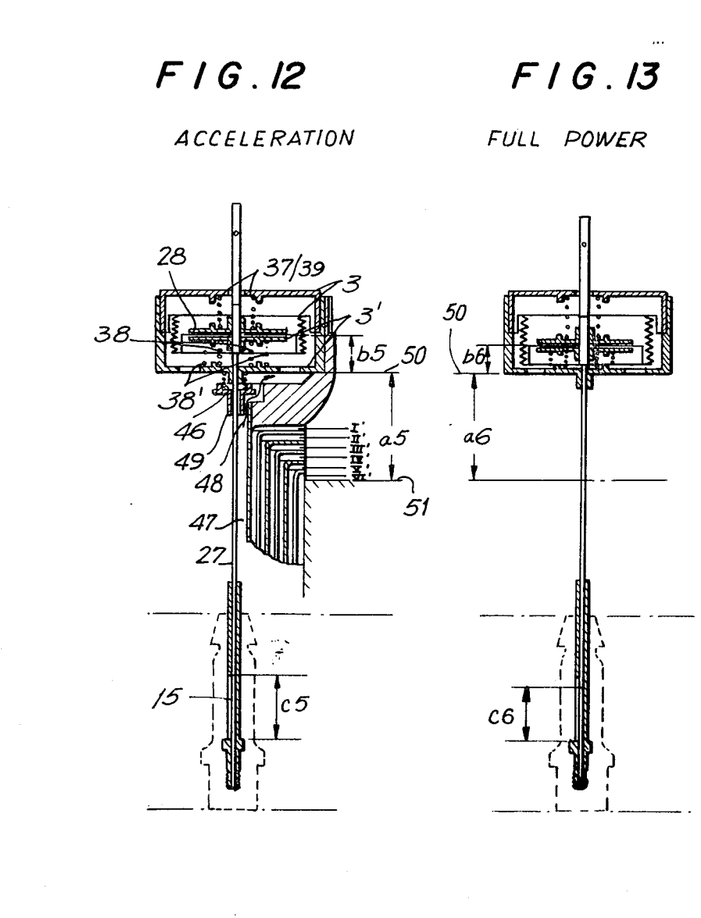
Figure 14:
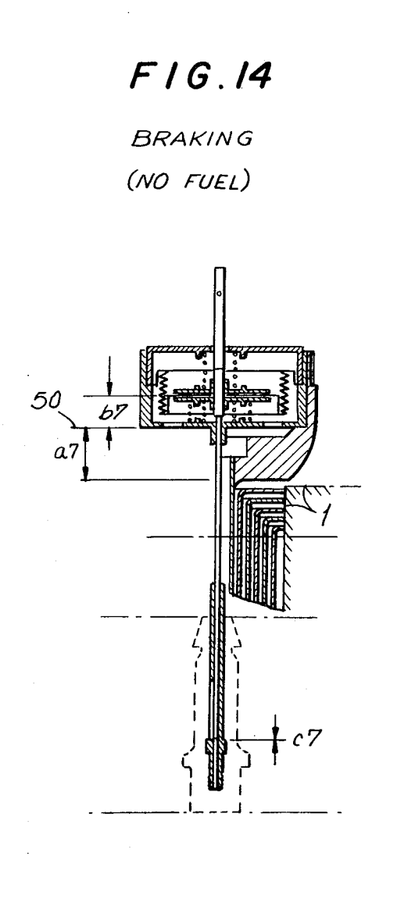
Figure 15:
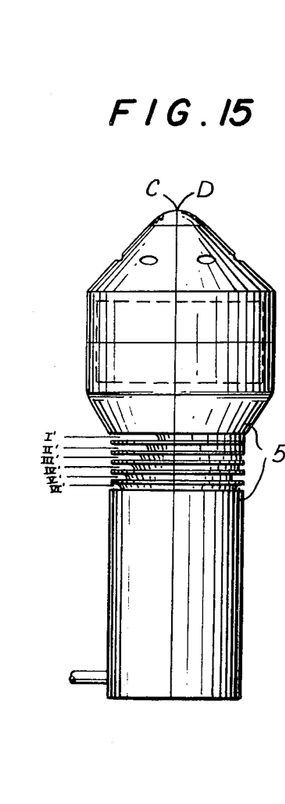
FIG. 15 is a side elevational view of the embodiment of FIG. 3.

If now the air tube is shifted to the "acceleration" position (FIG. 12), the partial vacuum behind the air tube is reduced. This higher pressure raises the valve head and through the slit the equalization of pressure quickly follows, At the same time the spring unit is pushed into the middle position. In FIG. 12 this, in comparison with FIG. 11, has already taken place.

In this way the prolongation of the interval $a^5$ is superposed and added from reference line 51 on (this is always the top edge of housing 1, just as reference line 50 is always the lower edge of the regulator system housing 3) for prolongation of the interval $b^5$.

This causes the fuel nozzle slot 15 to be opened over its whole length $c^5$ (FIG. 12), i.e. more than for full load (open throttle or full power) as shown at $c^6$ in FIG. 13. As soon as the engine speeds up, partial vacuum again builds up in bore 47.

As the equalization of pressure between bore 47 and space 78 beneath spring unit 28 can only be effected through slit 49, the partial vacuum pulling spring unit 28 downward initially takes effect only gradually. Needle 27 which reduces the gap $c$ and accordingly decreases the outlet sectional area of the fuel slot 15, moves only slowly.

Figures 8, 8A, 9:
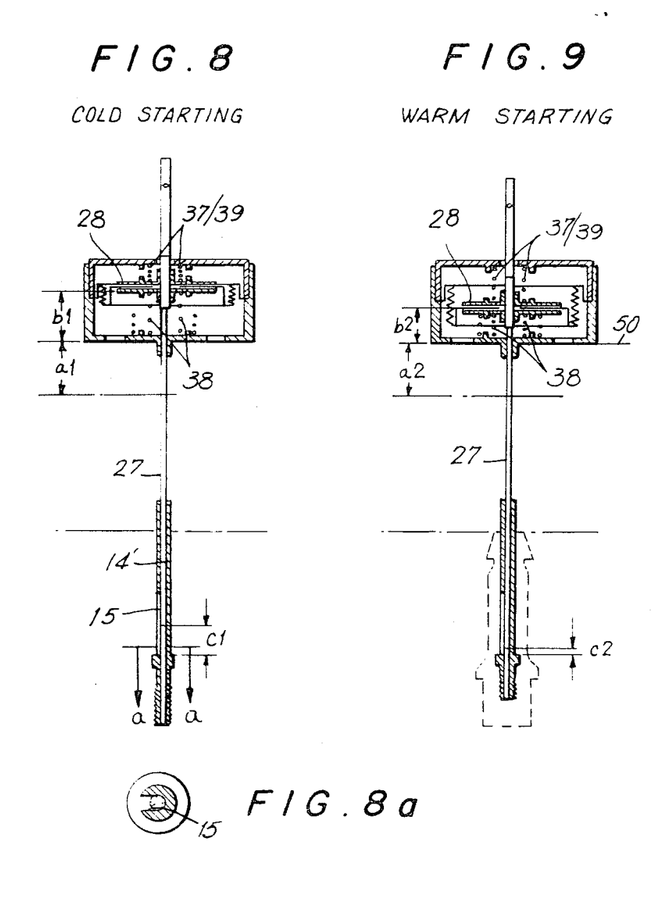
Figure 10:
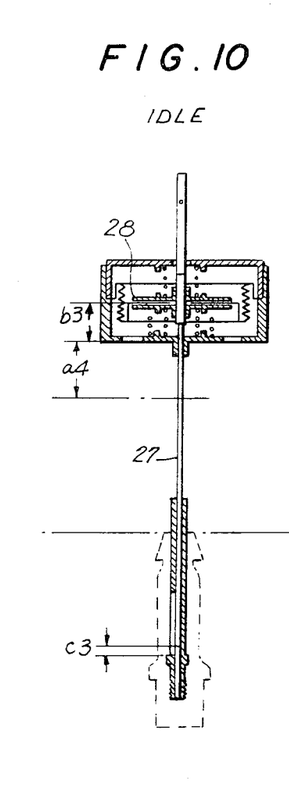

The effect of the accelerating movement thus released is considerably better than that obtainable by means of a so-called acceleration pump. The reason for this is that the action of the accelerating movement remains for a fairly long time, because of the damping action. In doing so, the accelerating movement provides for an optimum fuel-air mixture. The same holds true, also, for engine starting. In starting a cold engine, for instance, the fuel slot 15 is open as much as might normally be the case with the partial load in FIG. 11. This state is attained through the bimetal spring 37/39. The bimetal spring 37/39 compresses at low temperatures, so that spring 38 urges spring unit 28 into the position in FIG. 8. At the same time the needle 27 is brought into the position shown in FIG. 8. This location of the spring unit on cold starting corresponds with that for partial load, as shown in FIG. 11. FIGS. 8, 9 and 10 show air tube 5 in the same position. Nevertheless, the resultant open length of nozzle slot 15 differs in FIGS. 8, 9 and 10 (see $c^1$, $c^2$ and $c^3$).

When starting with a hot engine, the length of the nozzle slit ($c^2$) is shorter, since the expanding bimetal spring 37/39 displaces the spring unit 28 against spring 38.

Figures 6A, 6B, 6C, 6D, 6E, 6F:
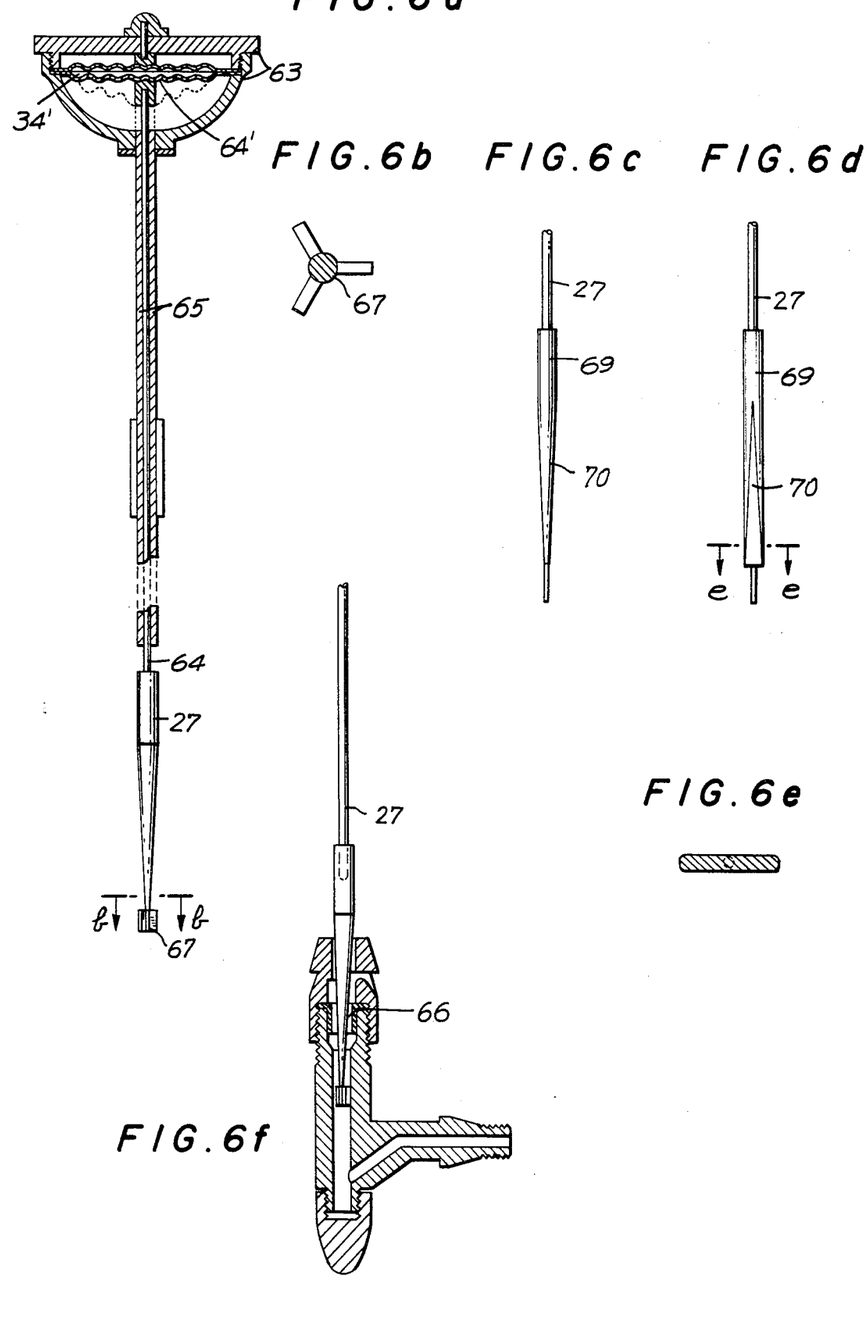

In FIG. 6a the needle 27 comprises a tip section of long conical taper construction. The tip has a three-arm guide attachment 67.

In this way, the tip of the needle can be accurately centered in the nozzle assembly and safely guided without any lateral displacement, as shown in FIG. 6f. The variation of the position of the needle in the bore 66 in the fuel nozzle 14' varies the size of the fuel outlet to control the fuel-air mixture.

In the needle shown in FIGS. 6c–6e the needle tip 69 is of the same diameter as nozzle aperture 66, into which it extends. The needle has two opposite oblique faces 70, which extend at an acute angle towards the tip of the needle. The needle has the advantage that it self-centers without an attachment. According to the shape of the surfaces, the fuel outflow may be linear, logarithmic or stepwise. Differences in level, that is altitudes, which are associated with considerable differences in barometric pressure can accordingly be compensated of by providing the process according to the invention, with an additional regulating procedure for fluctuations in atmospheric pressure, with direct action superimposed on the fuel jet needle. This can be simply effected by arranging a bellows 34' in a rotary knob 63 which serves for adjustment of the jet needle. Stem 64 of the needle is guided in a tube 65 and attached at its top to spring unit 64' of the bellows (FIG. 6). Bellows 34' can, of course, also be placed in regulator housing 3.

What is claimed is:

1. Apparatus for regulating a fuel-air mixture for internal combustion engines, said apparatus comprising an axial air supply means having an inlet for admission of air and an outlet for axial discharge of air, fuel supply means having a fuel inlet and an outlet proximate the outlet of said air supply means to introduce fuel into the air from said passage substantially axially to form an air-fuel mixture which flows axially, a suction pipe coaxial with said air supply means for conveying the axially flowing air-fuel mixture to the engine, first control means coupled to said air supply means and said fuel supply means to vary conjointly the size of the inlet of the air supply means and one of said inlet and outlet of the fuel supply means, and second control means for independently varying the size of the fuel inlet in response to ambient temperature and suction pressure in the suction pipe, said air supply means comprising a plurality of telescoped relatively fixed tubes defining a plurality of air passages each discharging air therefrom at a constant velocity.

2. Apparatus as claimed in claim 1 comprising means at said fuel outlet and facing said air outlet to cooperate therewith to provide ultrasonic vibrations for said air and the air-fuel mixture.

3. Apparatus as claimed in claim 1, wherein said first control means is operatively coupled with said plurality of tubes to open and close selected of the air passages by opening and blocking the inlets thereof.

4. Apparatus as claimed in claim 3 wherein the tubes forming the air supply means have recesses in the form of Venturi nozzles on the outside of their walls.

5. Apparatus as claimed in claim 4, wherein said recesses are developed in the form of steep spirals.

6. Apparatus as claimed in claim 4 comprising a cylindrical casing receiving said tubes, said first control means comprising a displaceable sleeve valve fitted between said tubes and said casing, and means for moving the sleeve valve to vary the size of the air inlet aperture of the passages in said tubes.

7. Apparatus as claimed in claim 6 comprising a displaceable, hollow fuel control needle adjacent said fuel inlet and first control means further comprising means coupling said sleeve valve and said needle for common displacement.

8. Apparatus as claimed in claim 7, wherein said second control means comprises a regulator needle opposite the hollow needle at said fuel inlet, said regulator needle and hollow needle defining a nozzle slot at said fuel inlet.

9. Apparatus as claimed in claim 4 comprising a cylindrical casing receiving said tubes for sliding movement therein, said second control means being mounted for common movement with said tubes, said first control means being fixed such that on variation of the size of the air inlet by displacement of the tubes the size of the fuel inlet correspondingly changes, said second control means comprising a regulator needle controlling the size of the fuel inlet as the tubes are displaced and means acting on said regulator needle in response to ambient temperature and suction pressure in said suction pipe to operate said needle independently of the displacement of the tubes.

10. Apparatus as claimed in claim 9, wherein said regulator needle has a conical tip, said fuel supply means comprising a fixed tube for fuel supply, said regulator needle being slidable in the latter said tube and including a part with grooves extending from said tip to keep the needle centrally in said tube.

11. Apparatus as claimed in claim 9, wherein said fuel supply means comprises a fixed tube for fuel supply, said regulator needle being slidable in the latter said tube and having two opposed faces tapering towards the end of the needle while providing a width equal to the diameter of said tube.

12. Apparatus as claimed in claim 9 comprising a hollow needle stem for said regulator needle, and adjustment means connected to the stem to provide additional correction of the location of the needle under fluctuations of atmospheric pressure, this being superposed on the second control means for adjusting the needle.

13. Apparatus for regulating a fuel-air mixture for internal combustion engines, said apparatus comprising a cylindrical housing, air supply means arranged axially within said housing and having an inlet for admission of air and an outlet for discharge of air, fuel supply means arranged coaxially to said air supply means and having a fuel inlet and an outlet proximate the outlet of said air supply means to form an air-fuel mixture, a suction pipe for conveying said air-fuel mixture to the engine, said air supply means comprising a plurality of telescoped cylindrical tubes having walls with recesses in the form of Venturi channels on the outside of their walls, and first control means coupled to said air supply means and said fuel supply means to vary conjointly the size of the inlet of the air supply means and one of said inlet and outlet of the fuel supply means, and second control means for independently varying the size of the fuel inlet in response to ambient temperature and suction pressure in the suction pipe.

14. Apparatus as claimed in claim 13 wherein said telescoped cylindrical tubes are funnel-shaped at their inlets and are of increasing length from the inner tubes to the outer tubes.

15. Apparatus as claimed in claim 13 wherein the end of the tube which makes up the inside wall of the first Venturi channel has a chamfered edge inclined sharply with respect to the axis of the tubes, said fuel supply means including a cap at the fuel inlet having an annular recess, with an outer bounding edge also sharply inclined to said axis to form an ultrasonic ejection of the fuel.

References Cited

UNITED STATES PATENTS

| | | | |
|---|---|---|---|
| 815,712 | 3/1906 | Johnston | 261—17 VV |
| 1,119,821 | 12/1914 | Gilliland et al. | 261—50 |
| 1,169,574 | 1/1916 | Schulz | 261—17 VV |
| 1,231,209 | 6/1917 | Sessions | 261—16 VV |
| 1,241,461 | 9/1917 | Adam | 261—17 VV |
| 1,375,898 | 4/1921 | Ciglia et al. | 261—50 X |
| 1,999,567 | 4/1935 | Kennedy | 261—50 |
| 3,273,868 | 9/1966 | Morton | 261—50 AA |
| 3,309,069 | 3/1967 | Braun et al. | 261—50 AA |
| 3,362,694 | 1/1968 | Gould | 261—50 AA |
| 3,533,606 | 10/1970 | Thatcher | 261—1 |
| 2,453,595 | 11/1948 | Rosenthal | 261—1 |
| 3,265,374 | 8/1966 | Morton | 261—50 A |
| 3,265,375 | 8/1966 | Morton | 261—50 A |

FOREIGN PATENTS

| | | | |
|---|---|---|---|
| 169,137 | 3/1922 | Great Britain | 261—50 |

TIM R. MILES, Primary Examiner

U.S. Cl. X.R.

261—DIG 38, 39 B, 50 R, DIG 63, 69 R